United States Patent Office 2,969,404
Patented Jan. 24, 1961

2,969,404
METHOD FOR THE PURIFICATION OF CONTAMINATED DRY CLEANING SOLVENTS

Heinrich Baümann, 2a Zuckerfabrikstrasse, Frankenthal, Pfalz; Fritz Graf, 17 Schuckerstrasse, Ludwigshafen (Rhine); Hubertus Schmidt, 3 Zuckerfabrikstrasse, Frankenthal, Pfalz; and Leo Unterstenhofer, 65 Trifelsring, Limburgerhof, Pfalz, all in Germany No Drawing. Filed Mar. 23, 1959, Ser. No. 800,905
Claims priority, application Germany Mar. 28, 1958
11 Claims. (Cl. 260—664)

This invention relates to a method for the purification of contaminated organic solvents or organic washing liquids such as are used in dry-cleaning and textile scouring operations containing as contaminating impurities fatty substances, textile finishing agents and odorous organic substances, the method of the invention being characterized by the adsorption separation of the aforementioned impurities from the contaminated organic solvent containing these by means of porous particles of rigid foamed absorbent agent consisting of water-insoluble, solvent-insoluble, thermoset synthetic condensation products from the class consisting of urea-formaldehyde condensation products, melamine-formaldehyde condensation products and phenol-formaldehyde condensation products, whereby more effective separation and lower mechanical solvent loss is achieved than in the case where the usual absorbents, e.g., kieselguhr, activated charcoal, silica gel, and the like are employed.

The rigid foamed absorbent agent in the form of thermoset condensation products of melamine-formaldehyde, urea-formaldehyde and phenol-formaldehyde are prepared by whipping or beating air or other inert gas into aqueous solutions or suspensions of these condensation products during an intermediate water dispersible stage of polymerization by condensation. One method which is suitable is that disclosed in the process of Schwencke Patent No. 2,666,036 and patent to Dennis, No. 2,763,475, for preparing the foamed rigid product.

The aqueous solution or suspension is prepared of any one of or mixtures of condensation products of melamine-formaldehyde, urea-formaldehyde and phenol-formaldehyde by condensing 1 mol of melamine or urea with from about 1.1–1.2 mols of formaldehyde based upon actual formaldehyde content in 37% aqueous formaldehyde solution for each amino group of melamine or urea, the pH being first adjusted to pH 5.7–9 with sodium hydroxide or triethanolamine, the mixture heated with agitation-until all of the urea or melamine dissolves, a temperature of about 80° C., and cooking continued until the viscosity thickens to form a syrup of desired consistency for the subsequent blowing operation.

With urea-formaldehyde solutions, the rate of heat is regulated so that the temperature is kept below 80° C., and there is usually required about 30 minutes heating of between 70–80° C. in order to provide uniform lower stage of reactive condensation product.

In the case of melamine-formaldehyde after all the melamine has dissolved, it is desirable to carry out the condensation at higher temperature, i.e., at the reflux temperature of reaction mixture for about 30 minutes.

The end point of condensation in both cases is determined by testing a sample of the syrup, just before the stage that the sample revealed a precipitate when diluted with an equal volume of water.

At this stage there may be added sodium meta bisulfite to produce an anionic, an amount of bisulfite as will provide 0.5 mol of sulfur dioxide for each 2.5 mols of urea and the pH is adjusted to pH 5.5–6 after refluxing is continued for an additional 10 minutes.

Alternatively the same procedure may be carried out with melamine-formaldehyde resin, an amount of sodium meta bisulfite being used which represents 0.5 mol of $SO_2$ to 3.5 mols of melamine.

Alternatively cationic properties are imparted at this same stage of reaction by adding at the end of the first cooking stage (30 minutes at 80° C. or at reflux, respectively) an amine modifier in an amount of 10% by weight of the urea or melamine, respectively, the amine employed being polyalkylene-polyamine, e.g., triethylenetetramine and amine, 2-aminopyridine, dicyandiamidine and polyphenylbiguanide (which is a condensation product of aniline, dicyandiamide, formaldehyde and an acid). The amine modifier is reacted at pH 2–3, the pH being maintained by adding sodium hydroxide as needed until the viscosity of about 100–300 cp. is achieved at 25° C.

To prepare a phenol-formaldehyde resin product 94 parts of phenol (1 mol), 150 parts of 30% aqueous formaldehyde (1.5 mols) and 9.4 parts of barium hydroxide octahydrate are charged into a reactor. Condensation is conducted at 70° C. for 5 hours. The product is vacuum concentrated at a temperature not above 70° C. until the resin contains about 35–37% of water. This is estimated by sampling every 30 minutes and drying the sample at 115° C. for 30 minutes. When the correct figure is reached, the resin is further heated for 4 hours.

The foregoing condensation products are now ready for thickening and whipping or blowing, there being added a hardening catalyst for converting by after-heat treatment the condensation proucts from an intermediate stage of polymerization to the final solvent-insoluble water-insoluble thermoset stage. Wetting agents and emulsion stabilizers are added, e.g., alkaryl sulfonates such as Naconal NR and acid hydrolized casein to facilitate foaming. To facilitate control of the thickening and hardening steps, it is desirable to employ filler, buffer and curing agent as a unitary addition which is uniformly blended into the resin syrup to provide proper consistency, minimized shrinkage on the after-heating step and to avoid excess acidity due to acid catalyst used in curing the resin.

Suitable fillers which may be used in amounts of 5–15% of the resin are finely divided wood flour, walnut shell flour, alumina, silica, kieselguhr, fuller's earth, etc., alone or in admixture, these preferably less than 60 mesh to permit uniform mixing.

For addition to the syrup of the phenol-formaldehyde condensation product, a strong organic acid catalyst may be used such as benzoic acid, phthalic anhydride, guanidine persulfate or p-toluene sulfonic acid in an amount of about 1.0–2.0% by weight of the resin and in this case a buffer is not necessary. Hexamethylene tetramine or paraformaldehyde may also be added in small amounts, e.g., 0.2–0.4 mol based on weight of resin. Also a base, e.g., calcium oxide or magnesium oxide may be used in amounts of 1–2% by weight of resin.

For syrups of urea-formaldehyde and urea-formaldehyde condensation product acidic catalysts, such as an inorganic salt of a weak base and strong acid is employed as curing catalyst, e.g., ammonium chloride, ammonium sulfate or ferric chloride in an amount of about 0.2–1.2% by weight of the resin and as a buffer, i.e., triethanolamine or tricalcium phosphate which is added in amounts of about 1 to 2 times the amount of catalyst. The buffer may be omitted if desired particularly in the case of melamine-formaldehyde condensation products.

As mentioned, a convenient foaming procedure is carried out in a pressure apparatus as disclosed in Schwencke Patent No. 2,666,036 or in Dennis Patent No. 2,763,475 in which the thickened composition is subjected under pressure of inert gas or air varying from about 15–200 pounds per square inch, discharged through a spray gun having a temperature slightly below the gelling temperature of the mixture whereby a foamed layer about ½ to 2 inches in height is produced in sheet form which can be placed on a conveyer belt for passage into a drying oven maintained at a temperature adjusted to the curing temperature for thermosetting of the resin. By varying the pressure and orifice opening of the spray gun, open pores are produced in the cured sheet material which may vary in size from about 1 mm. in diameter to about 10–15 mm. in diameter and which can be made uniform or nonuniform as desired. After baking the cured resin is comminuted and classified in the particle size as desired.

The baking oven is maintained at a temperature of about 125–195° C. and the sheet is permitted to dwell in the baking zone for a period of at least 15 minutes up to about 45 minutes. With urea-formaldehyde products and phenol-formaldehyde condensation products, a temperature of about 125 to 150° C. for about 30 minutes is sufficient. For melamine-formaldehyde products higher temperatures, e.g. 150 to 195° C., and longer time of dwell is desirable.

It may be desirable after grinding the porous rigid product to wash it with water, dry and then condition it in organic solvent of the kind as is to be employed for purification.

If desired, the curing step at elevated temperature may be omitted and the products may be foamed by the above discussed technique in which there will be present room temperature curing catalysts such as hydrochloric acid and sodium hydroxide. These products are not, however, as satisfactory as foamed rigid products cured by baking at elevated temperatures since the hardening agent is added after foaming and is mixed into the sheet material by spraying directed to both sides of the sheet material which is supported on a foraminous conveyer. This procedure represents greater hazard to personnel.

The form of the comminuted particles of synthetic rigid porous open-celled absorbent in accordance with the invention may vary widely. The particles may be formed as flakes or plates and may be dried on a drum drier and flaked with a knife rather than employing a drying oven as mentioned above. Grinding and chipping may be carried out to provide very large particles, one-half inch or longer in length or finely divided powder of the order of 100 to 350 mesh. These particles may be used as adsorbent alone or in admixture with silica gel, kieselguhr, or activated carbon absorbent.

In the chemical cleaning of textiles and textile fabrics in commerce organic solvents and organic washing liquids alone or with auxiliary cleaning agents, e.g. soaps, are employed for the purpose of removing organic solvent-soluble impurities such as fatty substances, odorous substances and textile finishing agents from the textile fibers. The organic cleaning and washing liquids containing the dissolved impurities require purification treatment to eliminate the impurities and to regenerate fresh solvent and organic cleaning liquid for efficient and economical operation. Particularly in the converting of natural and synthetic fibers into finished textile goods, some of the most important steps of textile processing are concerned with "wet processing" which with the advent of readily commercially available organic solvents at low cost has resulted in the consumption of over about 100,000,000 pounds of organic solvents annually for the processing of textile fibers. Of these solvents a majority are of five major types, (1) the alcohols, (2) the polyhydroxy compounds, (3) the ethers and glycol ethers, (4) the nitrogen compounds, e.g. triethanolamine and (5) the chlorinated hydrocarbons which may be used alone or in admixture with hydrocarbon solvents. The rigid expanded thermoset resins of the invention are insoluble in each of these five types of textile solvent agents.

The method of the invention is useful in each of the five types of solvents mentioned above but is of particular importance in solvent recovery operations of commercial dry-cleaning, degreasing and scouring operations utilizing chlorinated compounds and hydrocarbons such as benzol and benzine.

Incorporated into soaps, the chlorinated compounds such as carbon tetrachloride, ethylene dichloride, propylene dichloride, trichlorethane, trichloroethylene, perchlorethylene, dichloroethyl ether, and dichlorisopropyl ether are customarily used to aid in the removal of grease, oil, tar, and paint from textile fibers. All of these chlorinated organic compounds are insoluble in water, but easily emulsified to stable dispersions for use in spotting and scouring. In their pure state, they are classed as non-flammable solvents for the dry-cleaning trade, and are rapidly replacing the flammable solvents such as naphtha, exhibiting high efficiency from the point of view of grease solvency and penetration of fabrics and from the point of view of recovery by distillation to make them economical, with the treatment of the absorbents of the present invention.

A particularly preferred material is carbon tetrachloride, which is one of the most widely used solvents. It is admirably suited to all types of degreasing although the equipment in which it is used must be lead-lined or stainless steel. Garments, including those of acetate rayon, may be safely dry cleaned with carbon tetrachloride.

An object of the invention is to provide an improvement in solvent recovery procedures of the purification and removal of contaminants from organic solvents by utilizing porous particles of an adsorbent consisting of water-insoluble, solvent-insoluble, thermoset synthetic condensation products of urea with formaldehyde, melamine with formaldehyde and other and further objects of the present invention will appear from the more detailed description set forth below, it being understood that such more detailed description is given by way of illustration and explanation only and not be way of limitation, since various changes therein may be made by those skilled in the art without departing from the scope and spirit of the present invention.

In connection with that more detailed description there is shown in the following examples and illustrations a preferred mode of carrying out the invention in practice.

*Example I*

In an automatic dry cleaning machine which is continuously fed with carbon tetrachloride solvent between the cleaning kettle and a solvent reservoir tank filled to a solvent recovery still there is inserted a filter unit into the line between the "dirty solvent" outlet and a storage tank. The filter unit is constructed of a foraminous supporting plate formed of stainless steel of circular shape being 20 cm. in diameter, and supported on this filter plate. There is placed 150 cubic centimeters of porous open-cell urea-formaldehyde thermoset condensation product, having an average density of 6–10 kg. per 1 cubic meter and being of particle size 4–10 mesh U.S. standard screen.

A volume corresponding to a weight of 50 kilograms of spent carbon tetrachloride which has been contaminated by the impurities from use with 10 kilograms of textiles (dirty clothing) is passed from the "dirty solvent" outlet through the filter into the storage tank for treated filtrate.

A similar run was made with the same quantity of "dirty solvent" contaminated with the same amount of dirty clothing, using activated carbon (charcoal) in the same amount instead of the expanded urea-formaldehyde resin.

By comparing the filtrates from the respective treatments, it is seen that filtrate from the activated carbon (charcoal) treatment was colored yellow while the filtrate from the treatment with the synthetic absorbent in accordance with the invention was substantially colorless.

The mechanical hold-up of solvent in the 150 cubic centimeters of synthetic absorbent was practically nil (volume about 150 cc.) whereas the solvent hold-up with the 150 cubic centimeters was significantly greater.

Traces of solvent in the synthetic absorbent were readily removed by heating while removal of solvent from the charcoal required much higher temperatures.

*Example II*

The procedure of Example I was repeated using foamed open-cell melamine-formaldehyde with equally good results for clarification and low hold-up.

*Example III*

The procedure of Example I was repeated using foamed open-cell phenol-formaldehyde resin having a density of 6–10 kg. per cubic meter. Equally good results were obtained.

In the foregoing description pressure foaming operations are disclosed as being preferred for large scale industrial operations. However, the foaming operation can also be carried out in small batches by using known suitable whipping and agitating equipment which, similar to the egg-beating and whipping operations, serve to introduce large volumes of air or inert gas into the thickened condensate syrup.

Also it is within the scope and contemplation of the invention to employ the aforesaid expanded synthetic resins as preformed filter elements in sheet, plate or plug form as well as in granular form.

We claim:

1. A method for purification of contaminated dry-cleaning solvents containing as contaminating impurities fatty substances and textile finishing agents which are normally present in said dry-cleaning solvents used for cleaning clothes and textile scouring operations comprising treating the contaminated solvent with porous, rigid, foamed thermoset synthetic resin absorbent, said resin being selected from the class consisting of urea-formaldehyde condensation products, melamine-formaldehyde condensation products and phenol-formaldehyde condensation products whereby the contaminating impurities are absorbed by said absorbent and separating purified solvent from said absorbent.

2. A method for purification of contaiminated dry-cleaning solvents selected from the group consisting of chlorinated hydrocarbons and liquid hydrocarbon solvents containing as contaminating impurities fatty substances and textile finishing agents which are normally present in said dry-cleaning solvents used for cleaning clothes and textile scouring operations comprising treating the contaminated solvent with porous, rigid, foamed thermoset synthetic resin absorbent, said resin being selected from the class consisting of urea-formaldehyde condensation products and phenol-formaldehyde condensation products whereby the contaminating impurities are absorbed by said absorbent and separating purified solvent from said absorbent.

3. A method as claimed in claim 2 wherein said resin absorbent is formed as a preformed unitary filter element.

4. A method as claimed in claim 2 wherein said resin absorbent is formed as an assemblage of finely divided particles.

5. A method as claimed in claim 2 wherein said resin absorbent is formed as an assemblage of coarse particles.

6. A method as claimed in claim 2 wherein said resin absorbent is formed of phenol-formaldehyde condensation product.

7. A method as claimed in claim 2 wherein said resin absorbent is formed of melamine-formaldehyde condensation product.

8. A method as claimed in claim 2 wherein said resin absorbent is formed of urea-formaldehyde condensation product.

9. A method as claimed in claim 6 wherein said phenol-formaldehyde condensation product is admixed with inert solvent-insoluble and water-insoluble filler.

10. A method as claimed in claim 7 wherein said melamine-formaldehyde condensation product is admixed with inert solvent-insoluble and water-insoluble filler.

11. A method as claimed in claim 8 wherein said urea-formaldehyde condensation product is admixed with inert solvent-insoluble and water-insoluble filler.

References Cited in the file of this patent

UNITED STATES PATENTS

| | | |
|---|---|---|
| 2,139,629 | Alton | Dec. 6, 1938 |
| 2,698,870 | Bloch et al. | Jan. 4, 1955 |